(12) United States Patent
Wang et al.

(10) Patent No.: US 9,923,702 B2
(45) Date of Patent: Mar. 20, 2018

(54) SECTORIZATION FEEDBACK AND MULTI-SECTOR TRANSMISSION IN WIRELESS NETWORKS

(71) Applicant: MediaTek Singapore Pte. Ltd., Singapore (SG)

(72) Inventors: James June-Ming Wang, San Marino, CA (US); Jianhan Liu, San Jose, CA (US); Yung-Ping Hsu, Taipei (TW); Chih-Shi Yee, Baoshan Township, Hsinchu County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 44 days.

(21) Appl. No.: 14/761,771

(22) PCT Filed: Jan. 23, 2014

(86) PCT No.: PCT/US2014/012724
§ 371 (c)(1),
(2) Date: Jul. 17, 2015

(87) PCT Pub. No.: WO2014/116811
PCT Pub. Date: Jul. 31, 2014

(65) Prior Publication Data
US 2015/0333894 A1 Nov. 19, 2015

Related U.S. Application Data

(60) Provisional application No. 61/766,713, filed on Feb. 20, 2013, provisional application No. 61/756,607, filed on Jan. 25, 2013.

(51) Int. Cl.
*H04L 5/00* (2006.01)
*H04W 72/04* (2009.01)
(Continued)

(52) U.S. Cl.
CPC ......... *H04L 5/0073* (2013.01); *H04B 7/0417* (2013.01); *H04B 7/0452* (2013.01);
(Continued)

(58) Field of Classification Search
CPC .... H04L 5/0073; H04W 72/046; H04W 4/08; H04B 7/0417; H04B 7/0452; H04B 7/063; H04B 7/0491
See application file for complete search history.

(56) References Cited

U.S. PATENT DOCUMENTS

| 8,195,098 | B2 | 6/2012 | Wang et al. |
| 8,503,928 | B2 | 8/2013 | Wang et al. |

(Continued)

FOREIGN PATENT DOCUMENTS

| CN | 101682377 A | 3/2010 |
| CN | 101904109 A | 12/2010 |
| CN | 101939926 A | 1/2011 |

OTHER PUBLICATIONS

Savazzi, S., et al.; "A Comparative Analysis of Spatial Multiplexing;" IEEE Transactions on Vehicular Technology; vol. 58; No. 1; Jan. 2009; pp. 218-230.

*Primary Examiner* — Tejis Daya
(74) *Attorney, Agent, or Firm* — McClure, Qualey & Rodack, LLP

(57) ABSTRACT

A method of downlink multi-sector transmission is provided. An initiator station first performs sector training by transmitting a plurality of sounding signals to a plurality of responder stations in a wireless network. The coverage associated with the initiator station is partitioned into a plurality of sectors, and each sector is covered by a sectorized beam. The initiator station then receives sector ID feedback information from each responder station in response to the sounding signals. The sector ID feedback information indicates preference to each of the sectors from (Continued)

each responder station. Next, the initiator station groups multiple spatially orthogonal responder stations together based on the sector ID feedback information. Finally, the initiator station performs multi-sector transmission by simultaneously transmitting data to the multiple responder stations in different sectors using corresponding sectorized beams.

22 Claims, 6 Drawing Sheets

(51) Int. Cl.
    *H04B 7/0417*     (2017.01)
    *H04B 7/0452*     (2017.01)
    *H04W 4/08*     (2009.01)
    *H04B 7/0491*     (2017.01)
    *H04B 7/06*     (2006.01)

(52) U.S. Cl.
    CPC ......... H04W 72/046 (2013.01); H04B 7/0491 (2013.01); H04B 7/063 (2013.01); H04W 4/08 (2013.01)

(56) References Cited

U.S. PATENT DOCUMENTS

| | | | |
|---|---|---|---|
| 9,144,001 B2 | 9/2015 | Tu | |
| 2004/0063468 A1* | 4/2004 | Frank | H04B 7/0408 455/561 |
| 2004/0166887 A1* | 8/2004 | Laroia | H04B 7/0491 455/522 |
| 2005/0237989 A1* | 10/2005 | Ahn | H04J 11/0056 370/343 |
| 2006/0171357 A1* | 8/2006 | King | H04W 72/046 370/331 |
| 2007/0298742 A1* | 12/2007 | Ketchum | H04B 7/0617 455/186.1 |
| 2009/0232240 A1* | 9/2009 | Lakkis | H04B 7/0491 375/260 |
| 2009/0238156 A1* | 9/2009 | Yong | H04B 7/0695 370/336 |
| 2009/0316807 A1* | 12/2009 | Kim | H04B 7/061 375/260 |
| 2010/0002725 A1* | 1/2010 | Oh | H04W 16/02 370/468 |
| 2010/0214169 A1* | 8/2010 | Kafle | H01Q 3/26 342/368 |
| 2011/0075607 A1 | 3/2011 | Kim et al. | |
| 2012/0063377 A1* | 3/2012 | Osterling | H04W 72/1252 370/311 |
| 2012/0071116 A1* | 3/2012 | Gong | H04B 7/0408 455/114.2 |
| 2012/0230281 A1* | 9/2012 | Harada | H04W 72/082 370/329 |
| 2013/0017855 A1* | 1/2013 | Hui | H04W 16/28 455/522 |
| 2014/0153415 A1* | 6/2014 | Choudhury | H04W 72/0446 370/252 |
| 2015/0208439 A1* | 7/2015 | Cheong | H04B 7/0617 370/329 |
| 2015/0245377 A1* | 8/2015 | Lee | H04W 40/244 370/329 |
| 2015/0295629 A1* | 10/2015 | Xia | H04B 7/0491 370/329 |

\* cited by examiner

DL MULTI-SECTOR TRANSMISSION IN OBSS NETWORKS

SECTORIZED BEAM OPERATION

METHOD OF MULTI-SECTOR TRANSMISSION

SECTORIZATION FEEDBACK AND MULTI-SECTOR TRANSMISSION IN WIRELESS NETWORKS

CROSS REFERENCE TO RELATED APPLICATIONS

This application is a National Phase Application of PCT Application No. PCT/US2014/012724, filed on Jan. 23, 2014, which claims priority under 35 U.S.C. §119 from U.S. Provisional Application No. 61/756,607 filed on Jan. 25, 2013; U.S. Provisional Application No. 61/766,713 filed on Feb. 20, 2013, the subject matter of which is incorporated herein by reference.

TECHNICAL FIELD

The disclosed embodiments relate generally to wireless network communications, and, more particularly, to sectorization feedback and multi-sector transmission in wireless networks.

BACKGROUND

In wireless systems, if the coverage of a first basic service set (BSS-1) overlaps a part of the coverage of a second BSS-2, the two BSSs are called overlapping BSS (OBSS). When any of the access points (APs) or stations (STAs) tries to access the channels for wireless transmission, it performs a channel sensing and a random back-off contention procedure. Any station or access point that wins the contention can transmit into the wireless medium to gain transmit opportunities (TXOP), and other stations or access points that sense the channel is busy will defer their transmission until the TXOP is over. Such carrier sense multiple access (CSMA) wireless protocol minimizes the likelihood of collision in which more than one stations or access points transmit into the wireless medium causing the reception at the intended recipient to fail. In general, the CSMA protocol is intended for devices (station or access point) with omni-direction antennas such that all the devices sharing the wireless medium can hear one another. However, if one device cannot hear another device in the same wireless medium, the device is called a hidden node.

With a hidden node in the wireless network, potential collision can occur since the hidden device is unable to sense the transmission of other devices. Note that since the two wireless networks (e.g. BSS-1 and BSS-2 in this example) are sharing the same wireless medium for transmission, the achievable throughput of each individual network is reduced whereas the aggregate network throughput of the two wireless networks remains approximately the same. For long-range outdoor networks, the increased coverage range results in many overlapping wireless networks within the same area, thus leading to significant reduction in the throughput of each individual network. Therefore, there is a need to manage the communication in wireless networks with overlapping coverage.

Sectorization is a powerful technique commonly used in outdoor wireless networks. The partition of the coverage area of a BSS into sectors, each containing a subset of stations, is called sectorization. In a mobile-to-mobile communication context, the partition of a field of view of interest or a coverage area of a station into antenna sectors is called sectorization. This partition is generally achieved by the AP transmitting or receiving through a set of antennas or a set of synthesized antenna beams to cover different sectors of the BSS. The goal of sectorization is to reduce medium contention or interference by the reduced number of stations within a sector. During sectorized beam transmission, SO (spatially orthogonal) OBSS STAs and APs can receive the omni transmission but not the sectorized beam transmission from the OBSS APs and STAs. By dividing the coverage area into multiple sectors using sectorized beams, the hidden node issue can be mitigated and the overall network capacity increases due to more efficient spatial reuse.

Multi-user Multiple-input Multiple-output (MU-MIMO) is becoming a system technique to enable high system capacity in both IEEE 802 and 3GPP LTE standards. For spatially separated STAs, downlink (DL) MU-MIMO transmission transmits to multiple stations simultaneously. Unlike SU-MIMO, the MU-MIMO can be used in a LOS propagation while SU-MIMO is restricted to multipath propagation only. However, the current DL MU-MIMO suffers from the high complexity and overhead, especially for long-range outdoor sensor networks. High station implementation complexity results from the following reasons: channel measurement requires complicated computation, immediate compressed beamforming report feedback requires fast computation, and receiver might need multiple receive antennas to cancel self-interference. Additionally, the sounding and feedback to obtain channel information for MIMO operation consumes medium time since the large amount of channel measurement feedback transmission is required. This channel measurement is only valid within coherent channel time. For low volume and infrequent sensor or meter types of data traffic, new channel measurement update and feedback at each active period would be required, results in high signaling overhead.

On the other hand, DL MU-MIMO transmission realized using multiple sectorized beams could lead to many simplifications with good spatial isolation. For one, infrequent channel update is sufficient. Another reason is that the feedback data can be significantly reduced (simplified). Currently, there is no solution to employ the signal format and protocol of DL MU-MIMO to enable the simultaneous transmission to multiple stations using sectorized beam operation. A solution of DL multi-sector transmission (MST) is sought.

SUMMARY

The present invention discloses a wireless communication method. The method comprises by a plurality of first wireless devices feeding-back the signal quality received from the transmission of a second wireless device through different sectorized beams that enables the second wireless device to determine the best sector to transmit to a plurality of the first wireless devices.

The present invention also discloses a communication method for a wireless network, wherein the wireless network comprises a plurality of wireless devices. The method comprises a first wireless device transmitting simultaneously to multiple wireless devices within the wireless network using multiple sectorized beams transmission by employing the signal format and protocol of MU-MIMO. The method further comprises the first wireless device being able to group the multiple wireless devices in the multi-sector transmission using the feedback information received from the plurality of wireless devices within the wireless network.

In one novel aspect, an access point (AP) performs sector training by transmitting a plurality of sounding signal to a plurality of stations. Each sounding signal is transmitted to each sector using a corresponding sectorized beam. Each station then performs measurements on the received sounding signals and provide feedback information to the AP. In one embodiment, the feedback information from a station comprises a preferred sector ID, a received SNR at the preferred sector, and a bitmap with each bit indicating whether the station is able to receive signals at a corresponding sector. In another embodiment, the feedback information from a station comprises a preferred sector ID, a plurality of received SNRs corresponding to each of the plurality of sectors.

In another novel aspect, the AP performs downlink (DL) multi-sector transmission using sectorized beams. Based on the sector ID feedback information, the AP groups multiple spatially orthogonal stations together with each station in the group being assigned a unique sectorized beam with minimum cross-interference from the sectorized beam to other stations within the group. Using similar waveforms and rules as DL MU-MIMO, within a TXOP, the AP first starts with scheduling a multi-sector transmission using omni-beam transmission of a MU-MIMO preamble and signaling field, and then follows by the multi-sector transmission of multiple payloads/waveforms to the group of recipient stations identified by a group ID using multiple sectorized beams. The DL multi-sector transmission can increase network capacity significantly, has very low implementation complexity and low overhead, reduces latency for downlink traffic, and reduces power consumption for the stations.

In yet another novel aspect, both transmit sector training and receive sector training can be performed by an initiator station with a group of responder stations for multi-sector transmission to further enhance the system performance.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
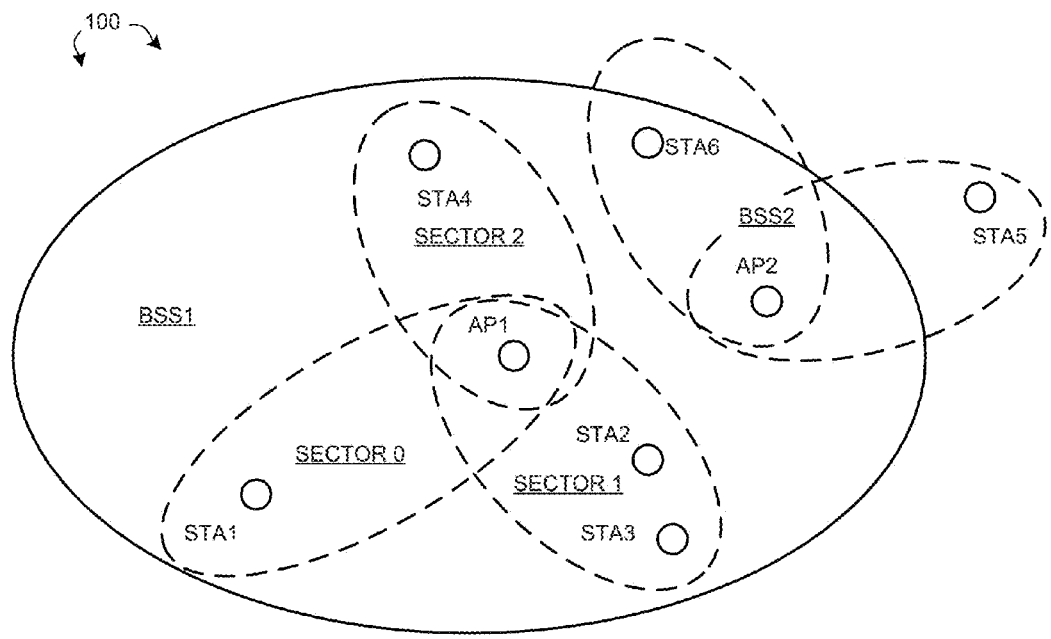
FIG. 1 illustrates a wireless network with overlapping BSS in accordance with one novel aspect.

FIG. 1 illustrates a wireless network 100 with overlapping basic service sets in accordance with one novel aspect. Wireless network 100 comprises a first basic service set BSS-1 and a second basic service set BSS-2. BSS-1 includes an access point AP1 and four stations STA1, STA2, STA3, and STA4. BSS-2 includes an access point AP2 and two stations STA5 and STA6. The coverage of BSS-1 overlaps a part of the coverage of BSS-2. The two BSSs are called overlapping BSS (OBSS). Since BSS-1 and BSS-2 shares the same wireless medium for transmission, the achievable throughput of each individual network (e.g., BSS-1 and BSS-2) is reduced. For long-range outdoor networks, the increased coverage range results in many overlapping wireless networks within the same area, thus leading to significant reduction in the throughput of each individual network.

Sectorization is a powerful technique commonly used in outdoor wireless network. The partition of the coverage area of a BSS into sectors, each containing a subset of stations, is called sectorization. In the example of FIG. 1, AP1 transmits or receives radio signals through a set of antennas or a set of synthesized antenna beams to cover different sectors of BSS-1. All stations associated with BSS-1 are covered by at least one sector. For example, STA1 is covered by sector 0, STA2 and STA3 are covered by sector 1, and STA4 is covered by sector 2. Stations are allowed to move from one sector to another sector. The entire BSS-1 is also covered by the omni transmission (omni-directional beam or omni directional antenna) of AP1.

One goal of sectorization is to reduce medium contention or interference by the reduced number of stations within a sector. During the sectorized beam transmission of AP1, a subset of SO (spatially orthogonal) OBSS non-AP STAs and OBSS APs can receive the omni transmission from AP1 but not the sectorized transmission from AP1. For example, AP2 is an SO OBSS AP and STA6 is an SO OBSS STA. Another goal of sectorization is to enhance the spatial reuse of the medium, because the SO OBSS non-AP STA or OBSS AP is allowed to access the channel during the sectorized beam transmission. Sectorized beam operation enables the AP and non-AP STA to spatially reuse the medium with OBSS non-AP STAs and OBSS APs. Significant network capacity (aggregate capacity of multiple OBSSs) enhancement is thus achieved in the OBSS situation by reduced medium contention and enhanced spatial re-use.

Another potential benefit of sectorization is the possibility of simultaneous transmission to a plurality of STAs located in different sectors. This increases the throughput within a BSS. The prior art MU-MIMO transmission is a way of realizing such simultaneous transmission to multiple users. For STAs located in different sectors, the downlink (DL) MU-MIMO transmission to these STAs is quite similar to the simultaneous transmission through directional (sectorized) beams. However, the current DL MU-MIMO suffers from the high complexity and overhead, especially for long-range outdoor sensor or meter networks.

In one novel aspect, a solution is to adopt the signal format and protocol of DL MU-MIMO to enable downlink (DL) multi-sector transmission (MST). It should be noted that the present invention is not restricted to the use of the MU-MIMO signal waveform such as that in IEEE 802.11ac standard for multi-sector transmission. However, adopting such waveform has the advantages that legacy stations can already process such waveform and the required modification would be minimized. DL Multi-Sector transmission is defined as the simultaneous transmission by an AP to a group of STAs at different sectors using sectorized beams. DL multi-sector transmission is similar to DL MU-MIMO as means for boosting capacity, but with very low implementation complexity and low overhead. In general, an AP performs sector training and collects feedback information from stations. The AP forms groups of spatially orthogonal stations using information from the sector ID feedback provided by the stations. Within a transmission opportunity (TXOP), the AP transmits omni preamble and signaling field to set up network allocation vector (NAV) protection, and then continues to transmit different payloads destined to a group of recipient stations identified by group ID in a multi-sector transmission for the remainder of the protected duration. The detail of MST using sectorized beams is now described below with accompanying drawings.

Figure 2:
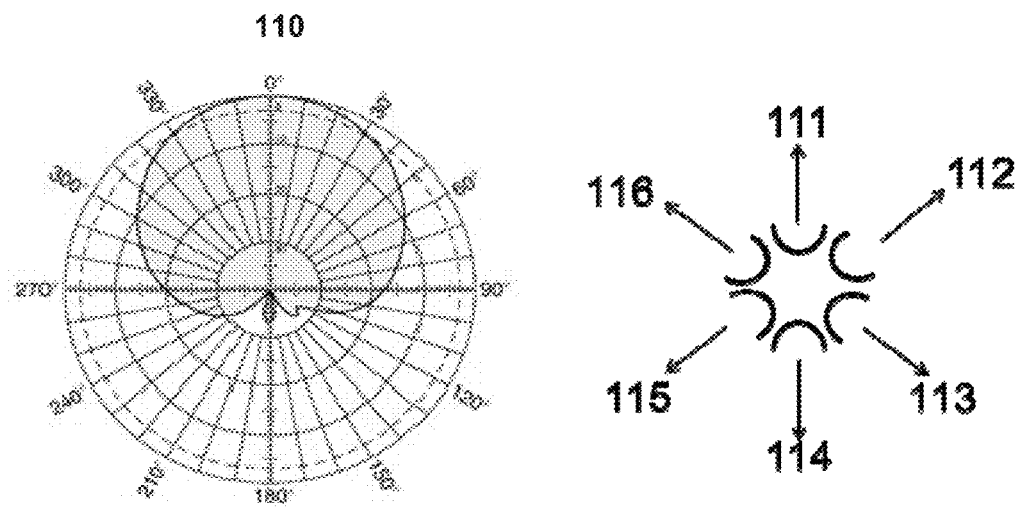
FIG. 2 illustrates sectorized beam operation in a wireless network in accordance with one novel aspect.

FIG. 2 illustrates sectorized beam operation in a wireless network in accordance with one novel aspect. The sectorized beam pattern 110 depicted in the left part of FIG. 2 can be realized by a panel sector antenna or other synthesized antenna methods. The six sectorized beams 111, 112, 113, 114, 115, and 116 depicted in the right part of FIG. 2 can be realized by duplicating the sectorized beam pattern 110 six times in 60-degree increments. In a typical outdoor deployment scenario, these antennas or synthesized beams, commonly situated on top of tall buildings or towers, are down-tilted to limit its range to the BSS coverage area and to avoid pick up interference from other BSSs outside of the coverage area. An omni-beam pattern can also be realized by transmitting through all six sectorized beams simultaneously and equally split the transmit power. Note that cyclic shift (CSD) insertion can be used to prevent unintentional beamforming for sectorized beams that are partially overlap. Also, note that these beams can be employed for both transmission and reception. The spatial reciprocity condition in which the transmission and reception uses the same antenna pattern can be a precondition.

A preferred embodiment of the synthesized sectorized beams is to employ a set of antenna elements with element pattern wide enough to cover the field of view of interest. A synthesized beam is produced with a predetermined antenna weight vector applying to the antenna elements. In the transmit direction, the antenna weight provides relative phase shifts and amplitude scalings of the signal going into antenna elements. In the receive direction, the antenna weight provides relative phase shifts and amplitude scalings of the received signals from antenna elements before they are combined. The antenna weight vectors for all the sectors are stored in a codebook. Each antenna weight vector is retrieved from the codebook when a particular sectorized beam is to be formed. For those skilled in the art may appreciate that there are many other ways to generate the sectorized beams as desired. Typically, a BSS may be partitioned into three, six, or eight sectors, depending on the beam pattern. For a mobile station, the field of view of interests are partitioned into multiple (8, 16, 32, etc.) sectors, depending on the beam pattern.

Downlink transmission to multiple users using the multi-sector transmission can lead to many advantages for long-range outdoor networks. The overhead for multi-sector transmission is very low. For outdoor networks, APs are strategically placed at higher position above the building, tower, or structure. As a result, AP transmission to STA or reception from STA is mostly directional. When STAs move within an area, the direction from AP to STA does not change much, thus frequent update of the STA's sector is not required. This is significantly different from MU-MIMO in which channel information only valid for a short coherent channel time. The overhead for sector ID feedback is also very small as compared to the beamforming report for MU-MIMO. AP uses fixed, pre-determined precoding matrices for synthesized beam or uses sector antennas for a group of stations in different sectors in a multi-sector transmission instead of that using precoding computed from the channel measurements in a MU-MIMO transmission. Furthermore, STA implementation complexity is very low because there is no need for channel measurement, only simple SNR measurement is sufficient to determine the best sector; there is no need for immediate compressed beamforming report feedback; and there is no need for interference cancellation. In conclusion, sectorized beam operation using multi-sector transmission is suitable for long-range outdoor networks.

Figure 3:
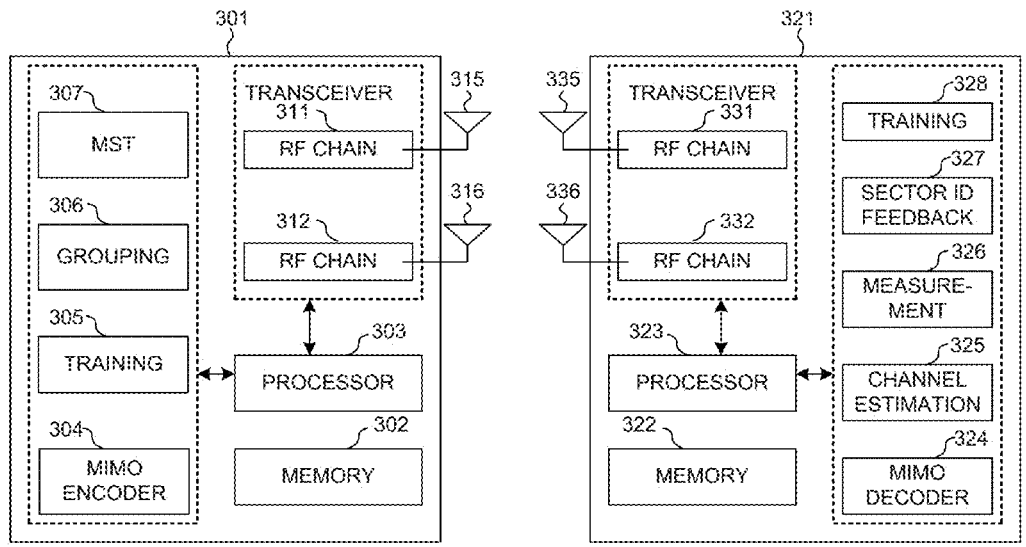
FIG. 3 illustrates simplified block diagrams of an access point and a station in a wireless system in accordance with one novel aspect.

FIG. 3 illustrates simplified block diagrams of an access point AP 301 and a station STA 321 in a wireless system in accordance with one novel aspect. AP 301 comprises memory 302, a processor 303, a MIMO encoder 304, a sector training module 305, a grouping module 306, a multi-sector transmission module 307, and a transceiver consists of a plurality of RF chain 311-312 coupled to a plurality of antennas 315-316, respectively. STA 321 comprises memory 322, a processor 323, a MIMO decoder 324, a channel estimation module 325, a measurement module 326, a feedback module 327, a training module 328, and a transceiver with one or a plurality of RF chains 331-332 coupled to one or a plurality of antennas 335-336, respectively. It should be noted that, unlike SU-MIMO, the non-AP STA could have a single antenna for receiving the MU-MIMO waveform.

The different modules in AP 301 and STA 321 may be functional modules and can be implemented by software, firmware, hardware, or any combination thereof. The function modules, when executed by the processor, allow AP 301 and STA 321 to perform DL multi-sector transmission. For example, at the AP side, training module 305 performs sector training by sending sounding signals to STA 321 (and other STAs in the BSS) and in response receiving sector ID feedback information so that the AP can select the preferred transmit beams. Grouping module 306 then forms groups of SO (spatially orthogonal) STAs using the information from the sector ID feedback. Within a transmission opportunity (TXOP), multi-sector transmission module (MST) 307 uses omni-beam transmission to a group of recipient stations identified by a group ID and setup NAV protection, and then continues with multi-sector transmission for the remainder of the PPDU. At the STA side, measurement module 326 performs radio signal measurements and derives SNRs for each sector during sector training. Based on the SNRs, feedback module 327 then provides information on preferred sector, SNRs, and/or receiver sector bitmap to AP 301. In addition, STA 321 may also include a training module 328 for performing receive sector training to select preferred receive beams to be paired with preferred transmit beams for enhanced multi-section transmission performance.

Figure 4:
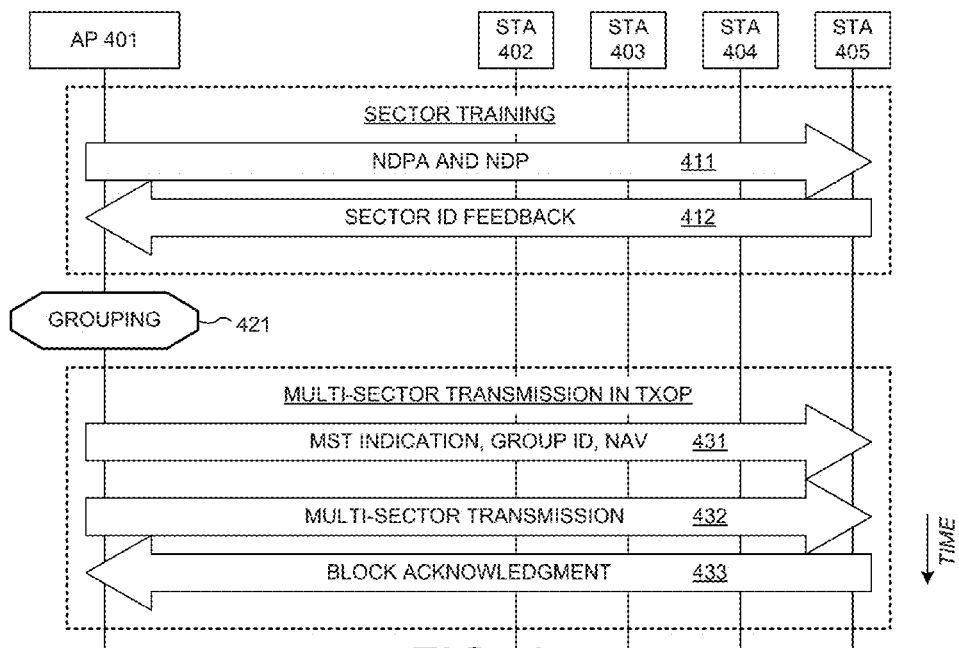
FIG. 4 illustrates a method of multi-sector transmission based on sectorization ID feedback.

FIG. 4 illustrates a method of multi-sector transmission based on sector ID feedback information in a wireless network. The wireless network comprises an access point AP 401, and a plurality of stations STAs 402-405. AP 401 first performs sector training. In step 411, AP 401 schedules periodic sector training within a beacon interval. For example, AP 401 sends out a null data packet (NDP) announcement (NDPA) followed by NDPs. The candidate NDPs may be a probe request NDP, or a short clear-to-send (CTS). For example, if a BSS is partitioned into eight sectors, then a sector training NDP is assigned with a specific indicator for the corresponding sectorized beams (e.g., sectorized beam ID=0-7) during sector training. Following an NDPA, NDPs with the assigned addresses will be transmitted through the corresponding sectorized beams during the sector training. In step 412, in response to the received NDPs, each of the stations STAs 402-405 sends sector ID feedback information back to AP 401. The sector ID feedback information from each station, for example, indicates its preferred sector ID, the signal to noise ratio (SNR) at a specific sector, and whether the station can receive signal at each station. After sector training, AP 401 gathers the feedback information from all stations and performs grouping accordingly (step 421). For example, if STA 402 and STA 403 are spatially orthogonal, then the two stations are grouped together. After grouping, AP 401 is then ready for multi-sector transmission. In step 431, AP 401 first uses omni-beam transmission to provide MST indication to a group of recipient stations (identified by a group ID) and setup NAV protection. In step 432, AP 401 switch to MST operation by transmitting data to the group of stations (e.g., STA 402 and STA 403) simultaneously using sectorized beams. Finally, in step 433, the group of recipient stations (e.g., STA 402 and STA 403) send block acknowledgment (BA) back to AP 401.

Figure 5:
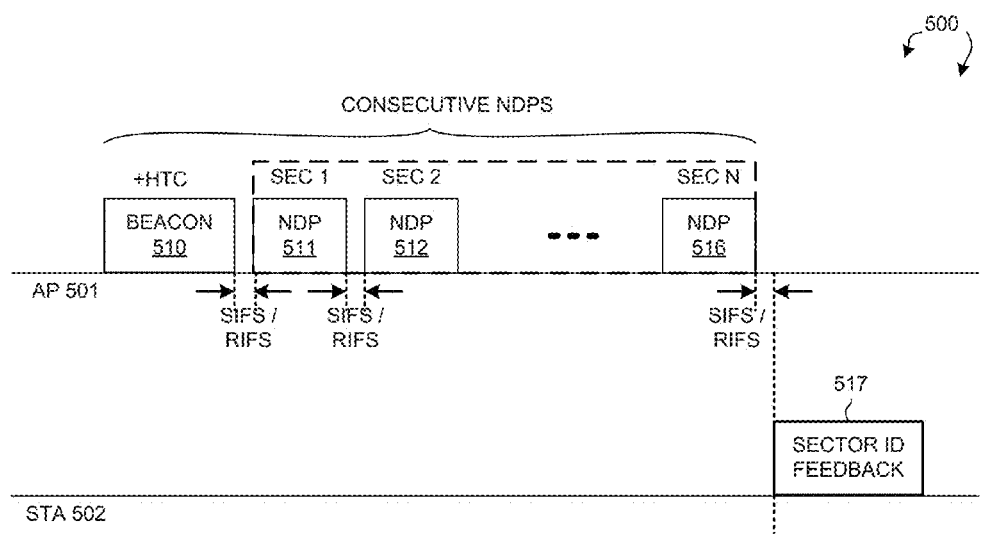
FIG. 5 illustrates one embodiment of sector training for multi-sector transmission.

FIG. 5 illustrates one embodiment of sector training for multi-sector transmission in a wireless network 500. In this embodiment, AP 501 sends out a beacon frame 510 that indicates which beacon interval a periodic sector training occurs via a Sector Operation element (Type 1). To further indicate the timing of sector training within a beacon interval, AP 501 schedules the sector training immediately after beacon frame 510. For example, in the beacon frame, AP 501 uses +HTC with NDP announcement=1 to schedule the sector training. During the sector training, AP 501 transmits a plurality of NDP frames with assigned indexes for each sector through a corresponding sectorized beam. For example, if there is a total of six sectors SEC1-SEC6, then NDP 511 contains an index indicating SEC1 and is sent through a sectorized beam of SEC1, NDP 512 contains an index indicating SEC2 and is sent through a sectorized beam of SEC2 . . . and NDP 516 contains an index indicating SEC6 and is sent through a sectorized beam of SEC6. In response to the NDPs, station STA 502 measures the radio signal strength/quality based on the received NDPs, and then transmits a sector ID feedback frame 517 back to AP 501.

Figure 6:
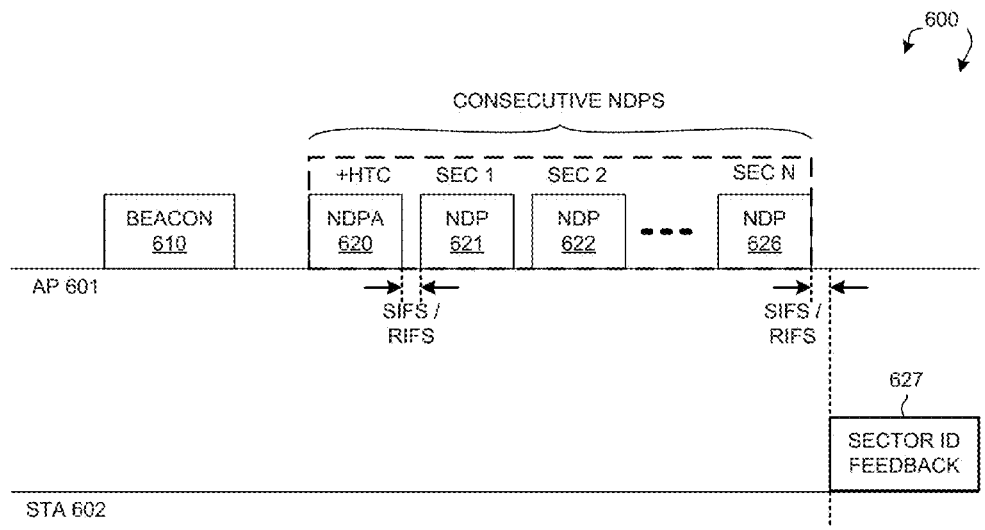
FIG. 6 illustrates another embodiment of sector training for multi-sector transmission.

FIG. 6 illustrates another embodiment of sector training for multi-sector transmission in a wireless network 600. In this embodiment, AP 601 sends out a beacon frame 610 that indicates which beacon interval a periodic sector training occurs via a Sector Operation element (Type 1). To further indicate the timing of sector training within a beacon interval, AP 601 schedules the sector training within a RAW. For example, AP 501 uses periodic RAW (PRAW) to assign a specific group ID to indicate the sector training. During the sector training, AP 501 first transmits an NDPA frame 620, followed by a plurality of NDP frames with assigned addresses for each sector through a corresponding sectorized beam. For example, if there is a total of six sectors SEC1-SEC6, then NDP 621 contains an address indicating SEC1 and is sent through a sectorized beam of SEC1, NDP 6222 contains an address indicating SEC2 and is sent through a sectorized beam of SEC2 . . . and NDP 626 contains an address indicating SEC6 and is sent through a sectorized beam of SEC6. In response to the NDPs, station STA 602 measures the radio signal strength/quality based on the received NDPs, and then transmits sector ID feedback frame 627 back to AP 601. It should be noted that AP 601 can also start the sector training in response to sector training request received from a station and AP can also start a sector training unsolicited when channel condition changes or the sector information becomes stale.

Figure 7:
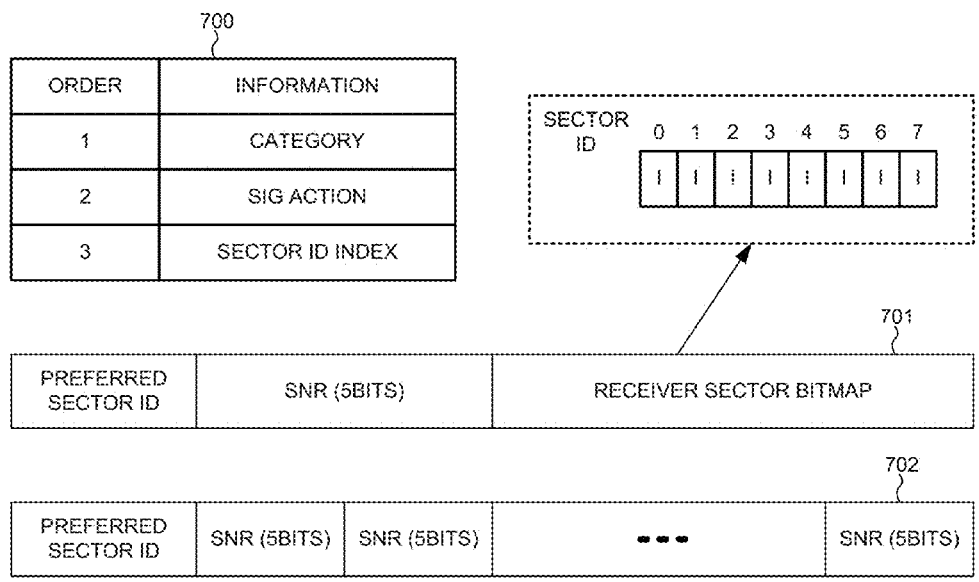
FIG. 7 illustrates one embodiment of providing sector ID feedback information.

FIG. 7 illustrates embodiments of providing sector ID feedback information. In the example of FIG. 7, the sector ID feedback uses an action frame 700, which includes a category field, a S1G action field, and a sector ID index field. In a first preferred embodiment, the sector ID index field is depicted by box 701, which includes a preferred sector ID (3 bits), an SNR for the preferred sector (5 bits), and a receiver sector bitmap (8 bits). The preferred sector ID indicates the sector in which the station receives AP signal with the highest signal quality. The SNR is the received SNR at the preferred sector. The receiver sector bitmap is a bitmap, where each bit indicates whether the station receives AP signal in a specific sector. The position of the bitmap (0-7) corresponds to the sector ID. For example, a bit I=0 indicates that the station does not receive AP signal (or the received AP signal quality is below a threshold) while a bit I=1 indicates that the station receives AP signal (or the received AP signal quality is above a threshold). In a second embodiment, the sector ID index field is depicted by box 702, which includes a preferred sector ID (3 bits) and SNRs for all sectors in the training. In a more sophisticated feedback scheme, the received SNR (instead of just the preferred sector) of all sectors are transmitted back.

Figure 8:
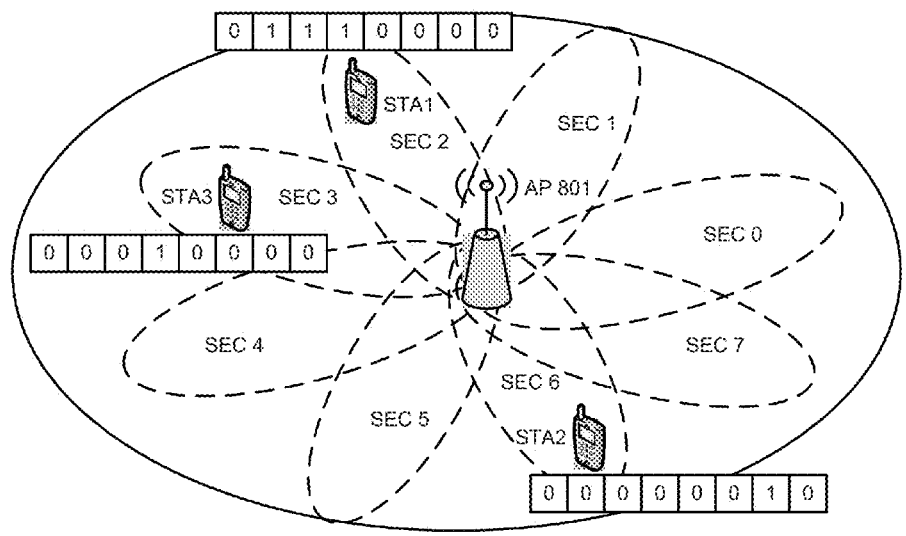
FIG. 8 illustrates one embodiment of grouping based on sector ID feedback information.

FIG. 8 illustrates one embodiment of grouping based on sector ID feedback for multi-sector transmission. After the sector training, the AP collects all sector ID feedback from the recipient stations and is then able to perform grouping for multi-sector transmission. In general, spatially orthogonal (SO) stations can be grouped together for multi-sector transmission without causing interference to each other. In the example of FIG. 8, AP 801 is associated with a BSS having three stations STA1, STA2, and STA3. The BSS is partitioned into eight sectors with sector IDs from SEC0 to SEC7. For STA1, its preferred sector ID is SEC2, and its receiver sector bitmap=01110000. For STA2, its preferred sector ID is SEC6, and its receiver sector bitmap=00000010. For STA3, its preferred sector ID is SEC3, and its receiver sector bitmap=00010000. If the preferred sector ID of a station corresponding to a "0" in the bitmap position of another station, then the two stations can be put in the same SO group since their assigned sector are mutually exclusive (non-interfering). As a result, STA1 and STA2 can belong to the same multi-sector group, STA2 and STA3 can belong to the same multi-sector group, but STA1 and STA3 cannot belong to the same multi-sector group because both stations are able to receive signals in SEC3. An STA belongs to a group is assigned a unique sector and does not cause interference to other STAs in the same group when transmitting through such sector.

Figure 9:
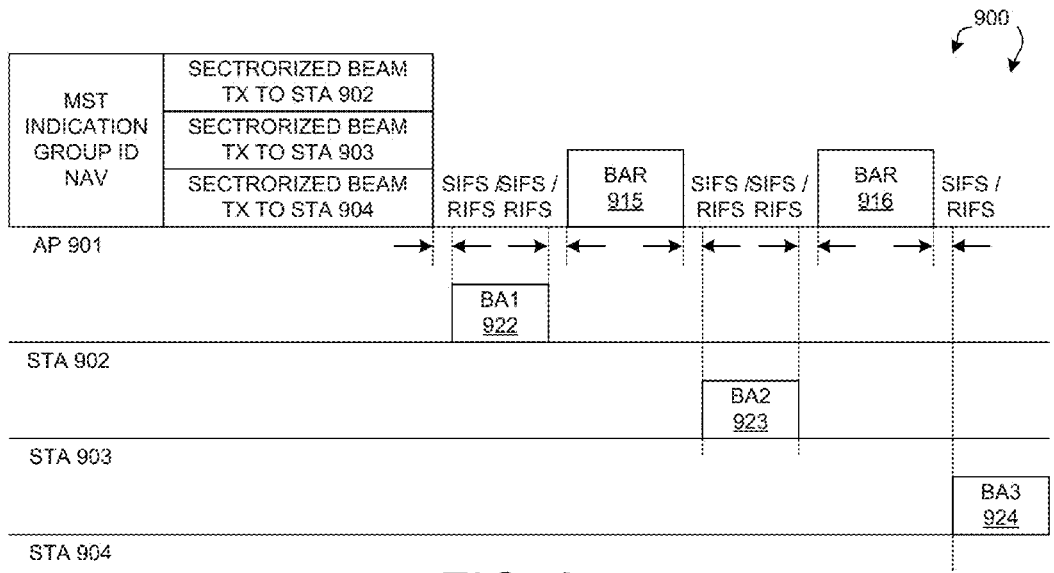
FIG. 9 illustrates one embodiment of multi-sector transmission using sectorized beams.

FIG. 9 illustrates embodiments of multi-sector transmission using sectorized beams in a wireless network 900. Wireless network 900 comprises an access point AP 901 and a plurality of stations STA 902-904. After sector training and grouping, AP 901 is ready to setup multi-sector transmission. In the embodiment of FIG. 9, the multiple stations STA 902-904 are grouped together in one SO group, and the same DL MU-MIMO TXOP sharing rules are adopted for multi-sector transmission.

First, AP 901 sends an MST indication with a group ID to setup NAV for the TXOP. The MST indication is required for multi-sector transmission since some of the stations 903-904 need to defer their acknowledgements (BA2, BA3) following the BAR (Block Acknowledgement Request). In a first option, MU-MIMO preamble can be directly applicable to multi-sector transmission without any changes. However, the receiving stations need to have MU-MIMO capability, and they can either ignore or process LTFs. The LTFs allow receivers to gain further knowledge of the channels. In a second option, SU preamble (all stations can receive SU preamble) is used. In a first example, a reserved bit in the SU preamble can be used for the MST indication. In a second example, AP 901 can setup multi-sector transmission through RAW (Restricted Access Window) scheduling and use SU preamble or start with an omni MAC NDP with group ID and an indication for multi-sector transmission, follows with SU preamble to each receiving station.

Next, AP 901 switches to multi-sector transmission and starts transmitting data to the SO group of stations using sectorized beams. For example, AP 901 transmits a first PPDU to STA 902 using a first sectorized beam preferred by STA 902, transmits a second PPDU to STA 903 using a second sectorized beam preferred by STA 903, and transmits a third PPDU to STA 904 using a third sectorized beam preferred by STA 904. The PPDUs are padded to the same length, following the same MU-MIMO rules as defined by the IEEE 802.11ac specification to ensure that stations will not transmit before AP's multi-sector transmission ends. Upon receiving the downlink data, STA 902 replies with a first block acknowledgment (BA1) in frame 922, STA 903 replies with a second BA2 in frame 923 after receiving a BA request (BAR) in frame 915, and STA 904 replies with a third BA3 in frame 924 after receiving another BAR in frame 916. Note that in another embodiment, if AP 901 has the capability to receive multiple signals from different sectors simultaneous, then the delayed BAs would not be required. All stations within the group can send acknowledgements at the same time. Note that although the invention describes AP being the multi-sector transmitter, there is no restriction that the STA cannot transmit multi-sector transmission using the same waveform and protocol rules described, providing that the STA is equipped with the capability to do so.

Figure 10:
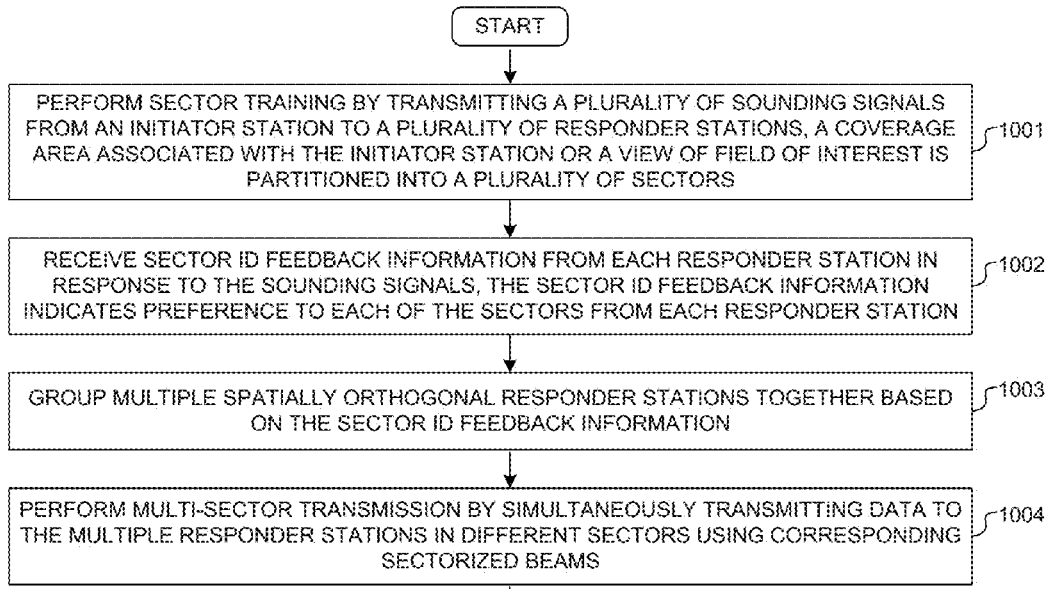
FIG. 10 is a flow chart of a method of sectorization feedback and multi-sector transmission in accordance with one novel aspect.

FIG. 10 is a flow chart of a method of sector ID feedback and multi-sector transmission in accordance with one novel aspect. In step 1001, an initiator station (e.g., an access point (AP)) performs sector training by transmitting a plurality of sounding signals to a plurality of responder stations in a wireless network. The coverage area associated with the AP or a view of field of interest is partitioned into a plurality of sectors. In step 1002, the AP receives sector ID feedback information from each station in response to the sounding signals. The sector ID feedback information indicates preference to each of the sectors from each responder station. In step 1003, the AP groups multiple spatially orthogonal responder stations together based on the sector ID feedback information. In step 1004, the AP performs multi-sector transmission by simultaneously transmitting data to the multiple spatially orthogonal responder stations in different sectors using corresponding sectorized beams.

In some wireless systems or standards, both MU transmitters and MU receivers employ sectorized beam. An example of this is 802.11ad in which sectorized beams for transmitting and receiving can be employed by both APs and STAs. In general, a station that initiates sector training is referred to as an initiator station, while a station that is the recipient of the sector training is referred to as a responder station. The novelty aspect of this invention is that both transmit sector training and receive sector training can be performed with a group of responder stations for multi-sector transmission to further enhance the system performance.

Figure 11:
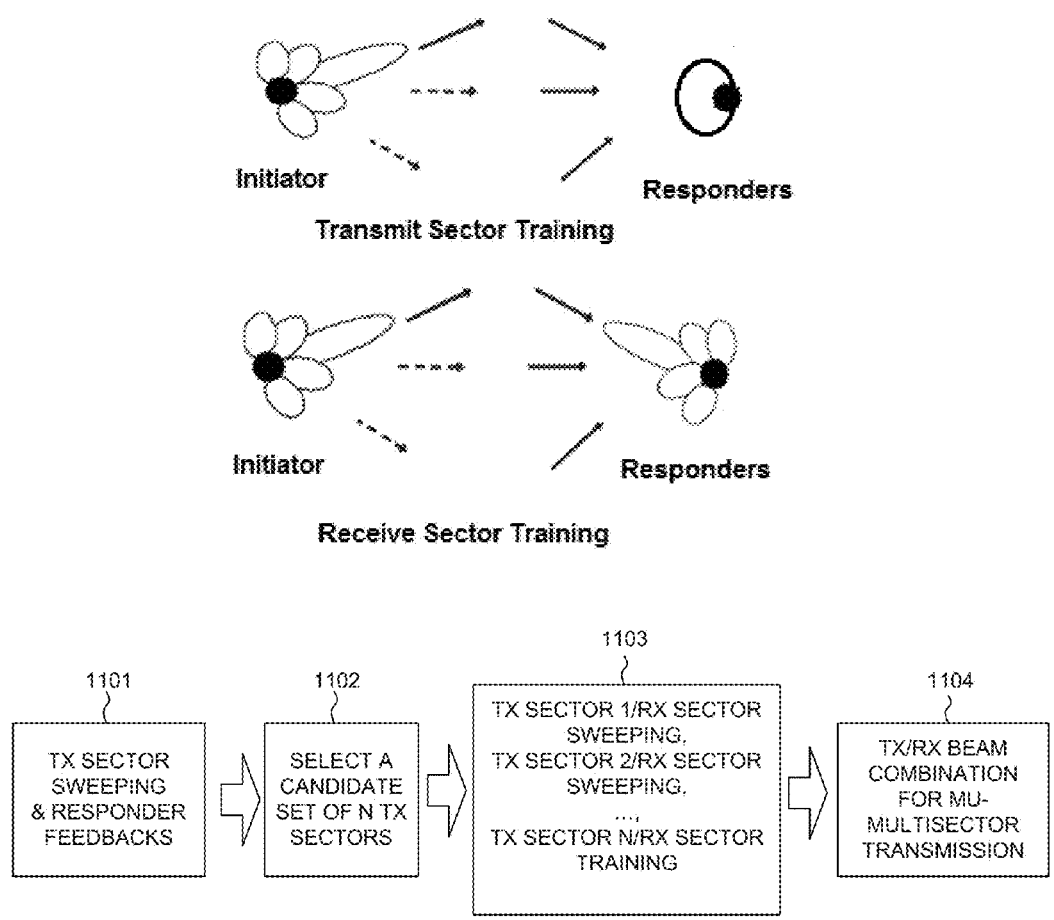
FIG. 11 illustrates one embodiment of both transmit sector training and receiver sector training for multi-sector transmission.

FIG. 11 illustrates one embodiment of both transmit sector training and receiver sector training for multi-sector transmission. A preferred embodiment of the sector training for multi-sector transmission starts with initiator transmit sector training followed by responder receive sector training.

In step 1101, the transmit sector training starts with the initiator transmitter transmits a set of NDPs while the plurality of the responder receivers in the intended recipient group employ omni-directional receive beam during the transmit sector training. Following the same protocol as described in FIGS. 5 and 6, the responder receivers send the multiple sector feedbacks with receive sectors and the corresponding SNRs for all sectors. In step 1102, the initiator transmitter identifies one or multiple candidate set(s) of transmit sectors for a particular MU transmission. For an intended group of n recipient STAs, each set of transmit sectors consists of n transmit sectors.

The next step is to engage in a group receive sector training. In step 1103, the initiator transmits a set of training NDPs through each of sector within one candidate set. The number of training NDPs, m, transmitted through a transmit sector needs to be larger than the highest number of responder receive sectors in the group. A total of n*m training NDP sectors are transmitted by the initiator. Each responder decides the best receive sector to be used based on the best signal quality and interference. The same receive sector training consisting of n*m training NDPs can be repeated if there are more than one candidate set. Finally, in step 1104, the best candidate set for multi-sector is selected and the responder stations also employ the best receive sector to be paired with the selected candidate set. As a result, the best transmit and receive beam combination is used for multi-sector transmission for enhanced performance.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) performing sector training by transmitting a plurality of sounding signals from an initiator station to a plurality of responder stations in a wireless network, wherein a coverage area associated with the initiator station or a view of field of interest is partitioned into a plurality of sectors;
   (b) receiving sector ID feedback information from each responder station in response to the sounding signals, wherein the sector ID feedback information indicates preference to each of the sectors from each responder station;
   (c) grouping multiple spatially orthogonal responder stations together based on the sector ID feedback information; and
   (d) performing multi-sector transmission by simultaneously transmitting data to the multiple spatially orthogonal responder stations in different sectors using corresponding sectorized beams,
   wherein the initiator station schedules the sector training immediately after transmitting a null-data-packet (NDP) announcement and a plurality of NDPs, wherein each of the NDPs indicates each of the sectors.

2. The method of claim 1, wherein each sounding signal is transmitted to each sector using a corresponding sectorized beam.

3. The method of claim 1, wherein the sector ID feedback information from a responder station comprises a preferred sector ID, a received SNR at the preferred sector, and a bitmap with each bit indicating whether the responder station is able to receive signals at a corresponding sector.

4. The method of claim 1, wherein the sector ID feedback information from a responder station comprises a preferred sector ID and a plurality of received SNRs corresponding to the plurality of sectors.

5. The method of claim 1, wherein the NDP announcement is included in a beacon frame.

6. The method of claim 1, wherein the initiator station schedules the sector training by using periodic RAW (PRAW) to assign a group ID to indicate the sector training.

7. The method of claim 1, wherein the initiator station starts the sector training in response to a sector training request or unsolicited.

8. The method of claim 1, wherein the initiator station schedules the multi-sector transmission by sending an omni-directional indicator with a group ID.

9. The method of claim 1, wherein the initiator station applies downlink MU-MIMO rules for multi-sector transmission without causing interference to the multiple responder stations.

10. The method of claim 1, wherein the initiator station also performs receive sector training such that preferred receiving beams are paired with preferred transmitting beams for each responder station for performing the multi-sector transmission.

11. An initiator station, comprising:
a processor that performs sector training by transmitting a plurality of sounding signals to a plurality of responder stations in a wireless network, wherein a coverage area associated with the initiator station or a view of field of interest is partitioned into a plurality of sectors;
a receiver that receives sector ID feedback information from each responder station in response to the sounding signals, wherein the sector ID feedback information indicates preference to each of the sectors from each responder station;
a processor that groups multiple spatially orthogonal responder stations together based on the sector ID feedback information; and
a transmitter that performing multi-sector transmission by simultaneously transmitting data to the multiple spatially orthogonal responder stations in different sectors using corresponding sectorized beams,
wherein the initiator station schedules the sector training immediately after transmitting a null-data-packet (NDP) announcement and a plurality of NDPs, wherein each of the NDPs indicates each of the sectors.

12. The initiator station of claim 11, wherein each sounding signal is transmitted to each sector using a corresponding sectorized beam.

13. The initiator station of claim 11, wherein the sector ID feedback information from a responder station comprises a preferred sector ID, a received SNR at the preferred sector, and a bitmap with each bit indicating whether the responder station is able to receive signals at a corresponding sector.

14. The initiator station of claim 11, wherein the sector ID feedback information from a responder station comprises a preferred sector ID and a plurality of received SNRs corresponding to the plurality of sectors.

15. The initiator station of claim 11, wherein the NDP announcement is included in a beacon frame.

16. The initiator station of claim 11, wherein the initiator station schedules the sector training by using periodic RAW (PRAW) to assign a group ID to indicate the sector training.

17. The initiator station of claim 11, wherein the initiator station schedules the multi-sector transmission by sending an omni-directional indicator with group ID.

18. The initiator station of claim 11, wherein the initiator station applies downlink MU-MIMO rules for multi-sector transmission without causing interference to the multiple responder stations.

19. A responder station, comprising:
a receiver that receives a plurality of sounding signals from an initiator station in a wireless network, wherein a coverage area associated with the initiator station is partitioned into a plurality of sectors;
a processor that performs radio signal measurements and thereby deriving measurement results of the received sounding signals for each sector; and
a transmitter that transmits sector ID feedback information to the initiator station based on the measurement results, wherein the sector ID feedback information indicates preference to each of the sectors of the responder station,
wherein the receiver further receives a null-data-packet (NDP) announcement and a plurality of NDPs from the initiator station before receiving the sounding signals, wherein each of the NDPs indicates each of the sectors.

20. The responder station of claim 19, wherein each sounding signal is transmitted to each sector using a corresponding sectorized beam.

21. The responder station of claim 19, wherein the sector ID feedback information from the responder station comprises a preferred sector ID, a received SNR at the preferred sector, and a bitmap with each bit indicating whether the responder station is able to receive signals at a corresponding sector.

22. The responder station of claim 19, wherein the sector ID feedback information from the responder station comprises a preferred sector ID and a plurality of received SNRs corresponding to the plurality of sectors.

* * * * *